3,098,059
RESINOUS COMPOSITIONS FROM TRIMELLITIC
ANHYDRIDE AND VIC-EPOXIDES
Richard E. Van Strien, Griffith, Ind., and William Hodes,
Stamford, Conn., assignors to Standard Oil Company,
Chicago, Ill., a corporation of Indiana
No Drawing. Filed Sept. 17, 1958, Ser. No. 761,479
13 Claims. (Cl. 260—78.5)

This invention relates to resinous products or compositions and to the process of making same and relates especially to resinous compositions comprising the product of reaction of trimellitic anhydride with a mono-epoxy compound containing a 1,2-epoxy group.

The reaction of polycarboxylic acids with polyhydric alcohols to produce resinous products is well known. In particular the preparation of resins by the reaction of phthalic anhydride with glycerol has been widely investigated and forms the basis for the alkyd resin industry which employs such resins variously modified by reaction with drying oils, together with polymerizable unsaturated monomers such as styrene and with other known reactants for the production of polymeric products of value in the surface coating field.

The preparation of alkyd resins, for example by the reaction of phthalic anhydride with glycerol, is essentially a polyesterification reaction wherein the reactants combine with the elimination of water to yield a three dimensional polymer network characterized by high hardness and brittleness. In the course of prepartion of these resins it has been found that the esterification reaction proceeds rapidly until the reaction is 60 to 70% complete, the rate of reaction then falling off markedly. In order to obtain resins of desirably low acid number, it has been found necessary to subject such reactants to extensive heating at elevated temperatures which often results in uncontrolled gelation of the product and the production of an infusible, insoluble material. The formation of such gelled reaction mixtures not only makes difficult the further elimination of water and thus the obtention of a product having desirably low acid number but also yields a product having low solubility in ordinary solvents and hence incapable of being applied as a thin film for use as a protective coating.

An object of our invention is to provide a resinous product capable of use in baked finishes. Another object is to provide an alkyd type resin for baked finishes from relatively inexpensive components. A further object is to provide resinous reaction products capable of being further reacted to provide compositions of diverse use in resins and protective coatings. These and other objects will become apparent in the course of the detailed description of the invention.

The novel compositions of our invention, consisting essentially of the reaction product of trimellitic anhydride and mono-epoxy compounds having a 1,2-epoxy group, are valuable resinous products suitable as surface coatings and as intermediates for the preparation of high boiling solvents and plasticizers. By proper selection of reaction conditions, partially polymerized, resinous compositions of our invention can be prepared which can be dissolved in ordinary solvents for application as surface coatings and subsequently baked to hard infusible and solvent resistant films. Alternatively, infusible and insoluble compositions of our invention can be prepared directly by effecting reaction of the epoxide compound and trimellitic anhydride at more elevated temperatures.

We have found that by proper selection of reaction conditions and the molar ratio of trimellitic anhydride to epoxy compound employed, partially polymerized resins can be obtained having high acid number and low hydroxyl number, low acid number and high hydroxyl number or, and this comprises the preferred embodiment of our invention, approximately equivalent acid number and hydroxyl number. The latter partially polymerized resins are soluble in acetone or other ordinary solvents and are eminently suited for the preparation of baked finishes since they may be heated at baking temperatures to give essentially non-acidic, insoluble, hard and flexible surface coatings.

The epoxy compounds which are employed as components of our invention are mono-epoxide compounds having a 1,2-epoxy group. Such compounds have the general formula

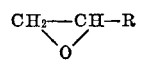

wherein R may be hydrogen, an aliphatic radical or an aromatic radical. Typical epoxy compounds which can be employed in our process include ethylene oxide, propylene oxide, styrene oxide, glycidyl ethers, glycidyl esters of aliphatic carboxylic acids, epichlorohydrin and the like. We have found that particularly valuable protective coatings are obtained by reaction of trimellitic anhydride and an unsaturated 1,2-epoxy compound for example glycidyl methacrylate, glycidyl allyl ether and the like. Such unsaturated epoxy compounds provide the advantage of extremely rapid cure at elevated temperatures thus reducing the baking time required to produce a protective coating of high flexibility and high impact resistance. Mixtures of epoxy compounds can be employed, especially mixtures of ethylene oxide or propylene oxide together with 10–90% of an unsaturated epoxy compound such as glycidyl methacrylate.

In the preparation of the resinous products of our invention, we have found that the properties of the resin can be readily controlled by varying the ratios of trimellitic anhydride to 1,2-epoxy compound employed as reactants. Resinous reaction products of our invention can be prepared by reacting from about 0.5 mole to about 10.0 moles, or even more, of epoxy compound per mole of trimellitic anhydride. Where the lesser amounts of monoepoxide compound within the indicated range are employed, for example from about 0.5 to about 1.5 moles of epoxy compound per mole of trimellitic anhydride, resinous products are obtained having relatively high acid number (mg. KOH required to neutralize one gram of sample) and extremely low hydroxyl number (mg. KOH required to neutralize the acetic acid liberated from one gram of acetylated sample), if any. These resinous products cannot be cured by baking, but can be further reacted with monohydric alcohols, for example, lower alkanols having from 1 to about 8 carbon atoms in the molecule, to produce viscous high molecular weight polyesters suitable as solvents, plasticizers for synthetic and natural resins, and the like.

In a preferred embodiment of our invention, we prepare resins by reacting from about 1.5 to about 5 moles of mono-epoxide compound per mole of trimellitic anhydride. We have found that this ratio of reactants results in the formation of soluble resinous reaction products having approximately equal acid number and hydroxyl number, that is, acid number/hydroxyl number ratios of about 2:1 to 1:2, which are eminently suitable for further heat treatment, as by baking to produce hard, flexible and solvent-resistant finishes.

Where a large excess of 1,2-epoxy compound is reacted with trimellitic anhydride, for example more than about 5 moles per mole of trimellitic anhydride, resinous products are obtained having high hydroxyl content and relatively little carboxyl content. Such resins can be further reacted with lower aliphatic monocarboxylic acids for the preparation of high boiling polyesters suitable as plasticizers, solvents and the like.

The resinous products of our invention are prepared by reacting trimellitic anhydride and a 1,2-epoxy compound in desired proportions in the presence of an alkaline catalyst at a temperature between about 20° C. and about 200° C. In the preparation of resinous products suitable for baked finishes, we prefer to employ a reaction temperature below about 120° C. in order to avoid cross-linking and gelling of the resinous reaction product with resultant insolubility of the resin in ordinary solvents such as acetone, methylethyl ketone and the like. As catalysts there may be employed inorganic or organic bases such as alkali hydroxide, calcium oxide, sodium amide, secondary amines such as di-ethylamine, dibutylamine, piperidine and the like and tertiary amines such as trimethylamine, tri-ethanolamine, pyridine and the like. We prefer to employ tertiary organic amines usually in an amount of about 0.1% to about 5% based on the weight of trimellitic anhydride employed. Suitably, the reaction is effected during a period of 2–24 hours, preferably 2–8 hours.

The present invention is further illustrated with respect to certain specific embodiments in the following examples and although said examples specify particular reactions, conversion conditions, etc., they are not intended thereby to limit the generally broad scope of the invention.

EXAMPLE 1

A series of compositions was prepared by reacting trimellitic anhydride with varying amounts of propylene oxide as follows:

(a) A mixture of 50 g. (0.260 mole) of trimellitic anhydride, 75.6 g. (1.3 mole) propylene oxide and 0.26 ml. of pyridine was agitated without external heating for 3 hours. A mildly exothermic reaction occurred, the temperature being maintained below the boiling point of propylene oxide (37° C.). The mixture was allowed to stand at ambient temperature to complete the reaction, and the viscous liquid product then added with vigorous agitation to 500 ml. cold water. The tacky resinous product which precipitated was dried in a vacuum dessicator and then ground to a fine white powder.

(b) Similarly 5.0 g. (0.026 mole) trimellitic anhydride, 5.2 g. (0.09 mole) propylene oxide and 0.05 g. triethylamine was stirred at 25° C. for 8 hours. The excess liquid was then removed under vacuum and the resinous product ground to a white powder having a melting point of 63–65° C.

(c) A mixture of 50 g. (0.26 mole) trimellitic anhydride, 37.8 g. (0.652 mole) propylene oxide and 0.23 ml. pyridine was agitated for 3 hours the temperature being maintained below 37° C. The resinous reaction product was recovered by treating the mixture as in (a) above.

(d) A mixture of 146.4 g. (0.762 mole) trimellitic anhydride, 44.2 g. (0.762 mole) propylene oxide and 0.73 ml. pyridine was stirred without cooling for 2 hours. The reaction temperature rose spontaneously to 60° C., and the mixture became extremely viscous. After two hours the product solidified. It was purified by solution in acetone, followed by addition of the acetone solution to cold water. The precipitated resin was then powdered and dried under vacuum.

The resinous products obtained in Examples 1(a)–1(d) were analyzed and the results obtained are given in Table I.

Table I

| Example | Mole Ratio, Trimellitic Anhydride/ Propylene Oxide | Acid No. | Hydroxyl Number | Ester No.[1] | Molecular Weight[2] |
| --- | --- | --- | --- | --- | --- |
| 1(a) | 1/5 | 60 | 158 | 417 | 2,700 |
| 1(b) | 1/2.5 | 94 | 73 | 416 | |
| 1(c) | 1/2 | 138 | 85 | 394 | 1,480 |
| 1(d) | 1/1 | 309 | 0 | 317 | 726 |

[1] Ester No.=Saponification Number—Acid Number.
[2] Ebullioscopic in acetone.

As will be apparent from Table I, the reaction of trimellitic anhydride with propylene oxide in a 1/1 molar ratios results in a product having substantially no free hydroxyl groups. While such products, or analogously those having only hydroxyl groups and no free carboxyl groups, are useful resins for various purposes described hereinafter, the resinous products having both residual hydroxyl and carboxyl groups are particularly valuable since they can be baked to hard, flexible, and solvent-resistant films.

EXAMPLE 2

This example illustrates the preparation of a resinous product from an unsaturated epoxy compound. A mixture of 40 g. (0.208 mole) trimellitic anhydride, 12.1 g. (0.21 mole) propylene oxide, 29.6 g. (0.21 mole) glycidyl methacrylate and 0.2 g. pyridine was stirred at room temperature for 24 hours, then allowed to stand overnight. The reaction product which had the appearance of a brittle glass was ground to a fine powder and stripped of volatile materials in a vacuum dessicator. The resin so obtained had an acid number of 49, a hydroxyl number of 66 and an ester number of 492. It was soluble in acetone.

EXAMPLE 3

Similarly, 2.0 g. (0.01 mole) trimellitic anhydride, 4.06 g. (0.044 mole) epichlorohydrin and 0.02 g. pyridine was stirred at 100° C. in an atomsphere of nitrogen. To avoid gelling, the temperature was maintained below 120° C. After 4 hours, the solution was treated with 1.0 g. of activated carbon and filtered. The clear pale, yellow solution was freed of volatiles by heating at 70° under a vacuum of 1 mm. Hg. A pale yellow, soft resin was obtained having a softening point of 70–75° C. and soluble in chloroform. After 2 hours in an oven at 150° C., this resin was converted to a hard, tough sheet which was infusible and insoluble in ordinary solvents such as acetone, alcohol and benzene.

EXAMPLE 4

A resinous product was prepared by refluxing a mixture of 50 g. (0.26 mole) trimellitic anhydride, 214 g. (4.65 mole) ethylene oxide and 0.25 ml. pyridine for 20 hours at 12–13° C. The viscous product of reaction was dissolved in acetone and reprecipitated by addition of the acetone solution to cold water. The product melting at 60° C. was a somewhat tacky solid.

In order to demonstrate the utility of the resinous products of our invention as surface coatings, particularly in the form of baked finishes, the resinous products obtained as described above were dissolved in acetone and the acetone solutions spread on glass and metal panels for standard tests. The product of Example 1(b) was tested alone, and in admixture with a commercial melamine-formaldehyde resin of the type widely employed for incorporation in alkyd resins for the production of baked finishes. For this purpose 8 grams of the resin obtained in Example 1(b) was mixed with 4 grams of Cymel 245-8 (American Cyanamid Company melamine resin containing 50% solids in a 1:1 butanol:xylene solvent) and the mixture stirred with an additional 8 grams of 1:1 butanol:xylene solvent until solution was complete. The results of these tests are tabulated in Table II.

*Table II*

| Resin of Example No. | 1(a) | 1(b) | 1(b)+25% Melamine Resin (Solids) | 1(c) | 3 |
| --- | --- | --- | --- | --- | --- |
| Baking Schedule, °C | 150° for 16 hours. | 150° for 4 hours. | 150° for ½ hour. | 150° for 16 hours. | 150° for ½ hour. |
| Hardness: | | | | | |
| Sward | 52 | 43 | 53 | 22.3 | 38.5. |
| Pencil | 3H | 4H | 5H | | |
| Flexibility [1] (Conical Mandrel) | Pass | Pass | Pass | Pass | Pass. |
| Impact Strength [2] (Inch-pounds) | 160 | 12 | 48 | 160 | 160. |
| Resistance [3] To Alkali (3% NaOH), hrs. | 3 | 6 | 6 | | |
| Washability [4] | No effect | No effect | No effect | No effect | No effect. |
| Ink Stain | Very Slight | None | None | | |

[1] ASTM D-522-41.
[2] Gardner Variable Impact Tester.
[3] ASTM D-154-53.
[4] Federal Specification TT-P-141b.

While the advantages of the products obtained by the process of the present invention are apparent from the data provided, the extreme hardness and flexibility of the baked finishes should be noted. These finishes were additionally highly resistant to water, gasoline and alcohol (ASTM test D-154-53) and retained their gloss even after long treatment with water. In particular, the rapid cure of the product of Example 3, which contains glycidyl methacrylate, should be noted.

EXAMPLE 5

Resinous compositions of our invention having high acid number and low hydroxyl number, or conversely high hydroxyl and low acid number are valuable intermediates for the preparation of high boiling polyesters as illustrated by this example.

A solution containing 5 grams trimellitic anhydride and 10.4 grams propylene oxide was stirred with .05 gram triethylamine for 8 hours at 30° C. The excess volatile material was removed by evaporation and the resin vacuum dried at 60° C. The product had an acid number of 181, a molecular weight of 685, and a ratio of free carboxyl to ester groups of 1 to 2.

A portion of this product (5.8 grams) was esterified with 11.1 grams of n-butanol in the presence of 0.15 gram methane-sulfonic acid by refluxing at 110° to 120° C. for 3½ hours. The unreacted butanol was stripped off by heating to 150° C. at 100 milliliters pressure. The product was a clear, colorless viscous liquid having an acid number of 20.8. This polyester is compatible with polyvinyl chloride and is suitable as a non-migratory, non-volatile plasticizer alone or in combination with other plasticizers for polyvinyl chloride such as dioctylphthalate and the like.

Similarly, desirable products of our invention having residual unreacted hydroxyl groups, can be reacted with a wide variety of carboxylic acids to produce high boiling neutral liquids or to produce products capable of further reaction to form resinous or plastic materials. For example, they may be reacted with lower aliphatic monocarboxylic acids, with aliphatic dicarboxylic acids such as adipic acid, sebacic acid and the like to produce flexible resins suitable as protective coatings. Additionally, they may be reacted with other polyfunctional materials such as diisocyanates, polyepoxides, epoxidized acids and esters and the like to produce thermosetting resinous compositions.

The products of our invention may be blended or reacted with other resins including polyesters, polyamides and the like, or fused with uncured urea-formaldehyde resins for preparation of heat-curing finishes. Other uncured polymers that can be modified by the product of our invention includes the melamine resins, phenol-formaldehyde resins, polyurethanes, polyacrylic acid, polyvinyl alcohol and the like.

We claim:

1. A resinous composition consisting essentially of the product obtained by reacting trimellitic anhydride with a mono-epoxide compound having a 1,2-epoxy group selected from the class consisting of lower-alkyl mono-epoxides, aryl lower-alkyl mono-epoxides, glycidyl esters of lower alkenoic acids and glycidyl ethers of lower alkenols in the presence of an alkaline catalyst at a temperature between about 20° C. and about 200° C.

2. A soluble resinous material having an acid number/hydroxyl number ratio in the range of about 2:1 to 1:2 and capable of being converted to the infusible insoluble state by heating at a temperature of about 150° C. consisting essentially of the product obtained by reacting trimellitic anhydride with a mono-epoxide compound having a 1,2-epoxy group selected from the class consisting of lower-alkyl mono-epoxides, aryl lower-alkyl mono-epoxides, glycidyl esters of lower alkenoic acids and glycidyl ethers of lower alkenols in a mole ratio of from about 1:1.5 to about 1:5 said reaction being effected at a temperature between about 20° C. and about 120° C. in the presence of an alkaline catalyst.

3. The product of claim 2 wherein the 1,2-epoxy compound is propylene oxide.

4. The product of claim 2 wherein the 1,2-epoxy compound is ethylene oxide.

5. The product of claim 2 wherein the 1,2-epoxy compound is epichlorohydrin.

6. The product of claim 2 wherein the 1,2-epoxy compound comprises from about 10% to about 90% of an epoxy compound having an olefinic linkage.

7. A resinous composition consisting essentially of the product obtained by reacting trimellitic anhydride and propylene oxide in a mole ratio of about 1:2 at a temperature of about 20 to about 50° C. in the presence of a catalytic amount of a tertiary amine, said composition having an acid number/hydroxyl number ratio of about 1.5 and capable of being converted to an infusible insoluble resin by heating at a temperature of about 150° C. for a period of from 4 to 16 hours.

8. A resinous composition consisting essentially of the product obtained by reacting trimellitic anhydride with an equimolar mixture of propylene oxide and glycidyl methacrylate, the molar ratio of trimellitic anhydride to total epoxide compound being about 1:2, at a temperature of about 20° to about 50° C. in the presence of a catalytic amount of a tertiary amine, said composition having an acid number/hydroxyl number ratio of about 1.0 and an ester number of about 492 and capable of being converted to an infusible, insoluble resin by heating at a temperature of about 150° C. for a period of from about 0.5 to 4 hours.

9. A composition of matter prepared by esterifying a lower monohydric alkanol having from 1 to 8 carbon atoms in the molecule with the product of reaction of propylene oxide with trimellitic anhydride in a molar ratio between about 0.5:1 and about 1.5:1, said reaction being effected at a temperature between about 20° and 200° C. in the presence of an alkaline catalyst.

10. The composition of claim 9 wherein said alkanol is n-butanol.

11. A process for the preparation of a resinous material capable of being converted to the infusible insoluble state which comprises reacting trimellitic anhydride with a mono-epoxide compound having a 1,2-epoxy group selected from the class consisting of lower-alkyl mono-epoxides, aryl lower-alkyl mono-epoxides, glycidyl esters of lower alkenoic acids and glycidyl ethers of lower alkenols at a temperature between about 20° C. and about 120° C. in the presence of an alkaline catalyst, the mole ratio of trimellitic anhydride to epoxide compound being between about 1:1.5 and about 1:5.

12. The process of claim 11 wherein the epoxy compound contains an olefinic linkage.

13. The process of claim 12 wherein the epoxy compound comprises from about 10 to about 90% glycidyl methacrylate.

References Cited in the file of this patent

UNITED STATES PATENTS

| | | |
|---|---|---|
| 2,847,395 | Wear | Aug. 12, 1958 |
| 2,947,712 | Belanger et al. | Aug. 2, 1960 |

OTHER REFERENCES

"Trimellitic Anhydride" by Amoco Chemicals Corporation, Development Department, 910 South Michigan Ave., Chicago, Ill. (1958), 32 pages in publication, only pages 8, 9, 27, 28 and 29 relied on.